United States Patent [19]
Nakayama

[11] Patent Number: 5,519,819
[45] Date of Patent: May 21, 1996

[54] GRAPHIC MOVING/TRANSFORMING METHOD AND APPARATUS

[75] Inventor: Yasutomo Nakayama, Asaka, Japan

[73] Assignee: International Business Machines Corporation, Armonk, N.Y.

[21] Appl. No.: 937,092

[22] Filed: Aug. 31, 1992

[30] Foreign Application Priority Data

Oct. 31, 1991 [JP] Japan .................................. 3-311572

[51] Int. Cl.$^6$ ..................................................... G06F 15/62
[52] U.S. Cl. ..................................................... 395/136
[58] Field of Search .................................. 395/136, 133, 395/141, 137, 138, 155, 161; 345/126, 127, 180, 181

[56] References Cited

U.S. PATENT DOCUMENTS

| | | | |
|---|---|---|---|
| 3,925,765 | 12/1975 | Berwin et al. | 340/172.5 |
| 4,914,605 | 4/1990 | Loughmiller, Jr. et al. | 364/518 |
| 4,985,849 | 1/1991 | Hideaki | 364/518 |
| 5,187,753 | 2/1993 | Bloomberg et al. | 382/46 |
| 5,268,999 | 12/1993 | Yokoyama | 395/141 |

FOREIGN PATENT DOCUMENTS

| | | | |
|---|---|---|---|
| 1318168 | 12/1989 | Japan | G06F 15/62 |
| 2292677 | 12/1990 | Japan | G06F 15/60 |

*Primary Examiner*—Phu K. Nguyen
*Attorney, Agent, or Firm*—A. Bruce Clay

[57] ABSTRACT

A graphic processing method and apparatus allows the operator to easily draw a curve with any curvature in any section of a graphic on the display screen of a computer. A frame appears when selecting a subject graphic to be transformed by operating a mouse. The frame has an operating member for size change, an operating member for movement, operating members for rotation, and an operating member for movement of the center. Each of the rotation operating members has a frame and a subject graphic rotation operating member, a frame rotation operating member, or a subject graphic rotation member. By selecting any one of the operating members, the subject graphic and frame rotate together, or only the frame or subject graphic rotates. The ratio for enlargement or reduction can be changed in accordance with the direction of the subject graphic by rotating only the frame or subject graphic and moving the transformation center according to necessity before changing the size. Therefore, it is possible to draw a curve with any curvature in any section of a graphic.

6 Claims, 8 Drawing Sheets

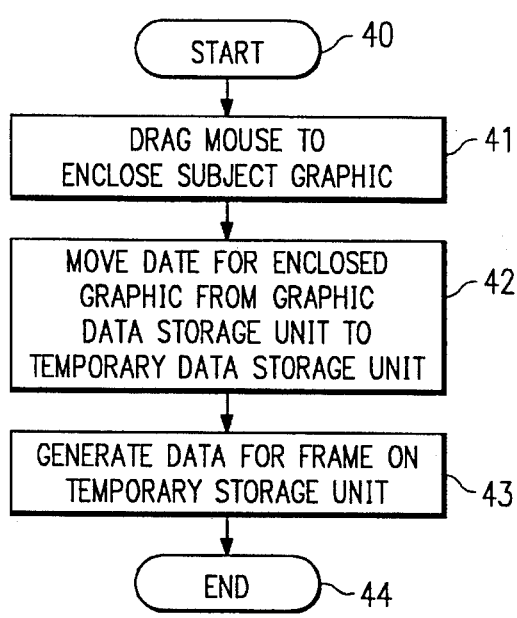
FIG. 4
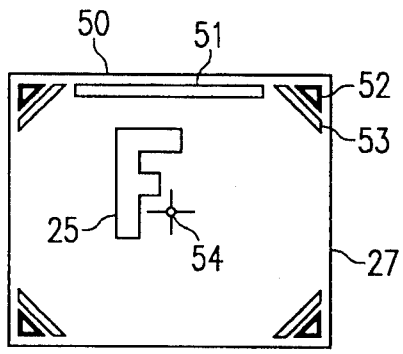
FIG. 5
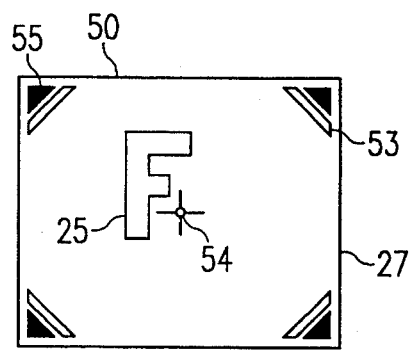
FIG. 6
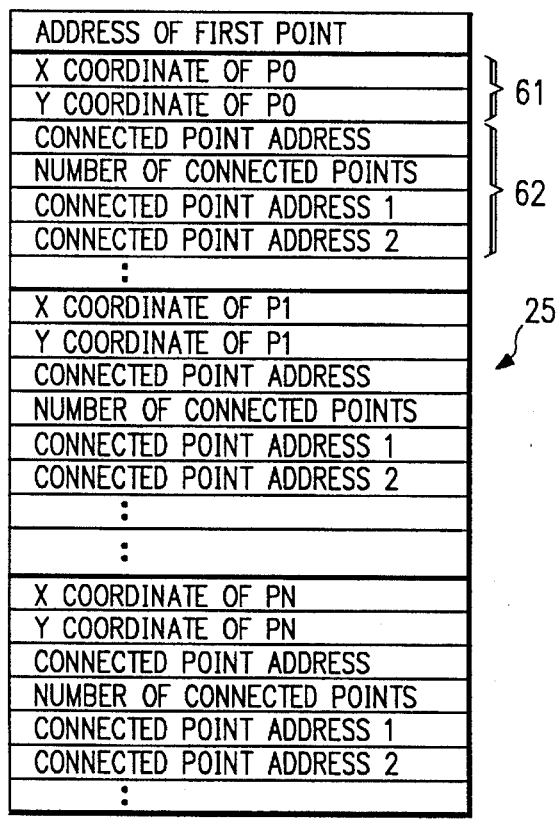
FIG. 7
| X COORDINATE OF FRAME |
| Y COORDINATE OF FRAME |
| WIDTH OF FRAME |
| HEIGHT OF FRAME |
| INCLINATION OF FRAME (ANGLE) |
| POSITION OF CENTER POINT |
| DATA FOR MOVING HANDLE (POSITION AND SIZE) |
| DATA FOR ROTATING HANDLE (POSITION AND SIZE) |
| DATA FOR SIZE CHANGING HANDLE (POSITION AND SIZE) |
FIG. 8

$F_{1H}:F_{2H}=T_{1H}:T_{2H}$
$F_{1W}:F_{2W}=T_{1W}:T_{2W}$

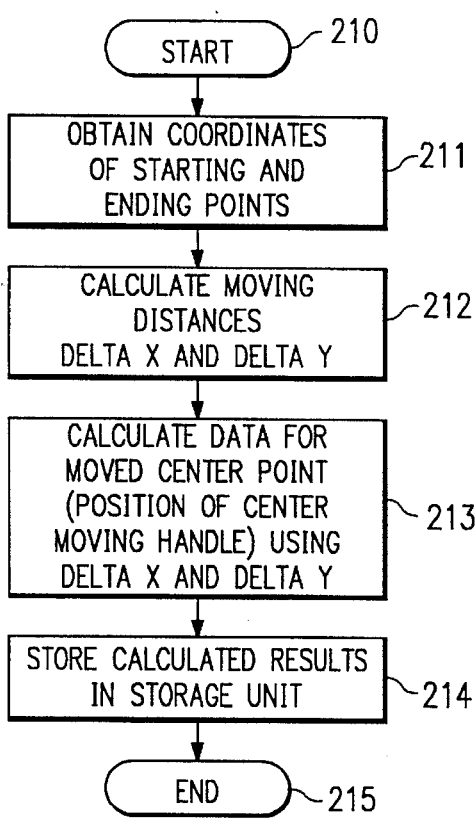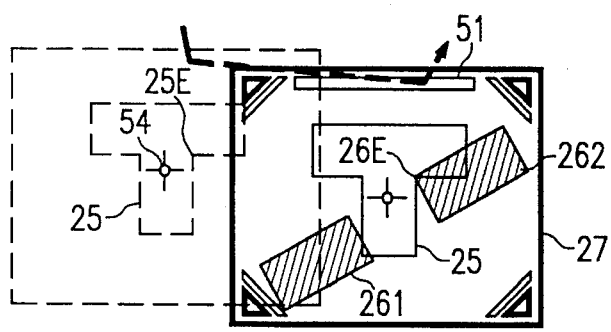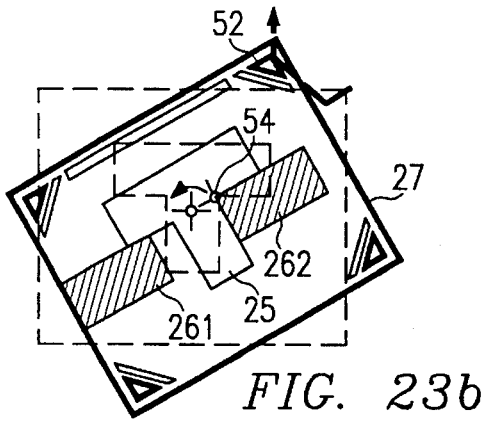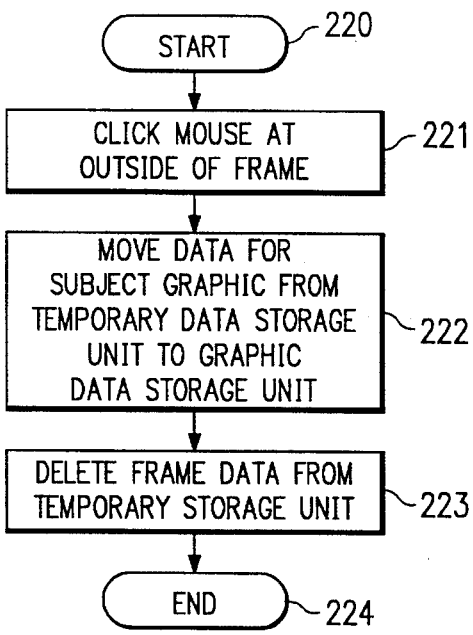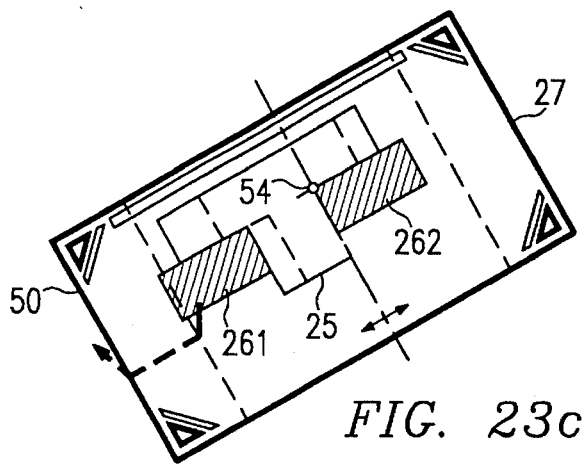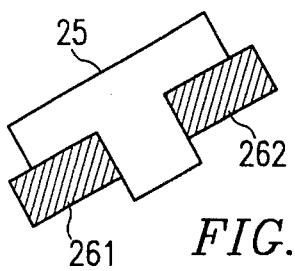

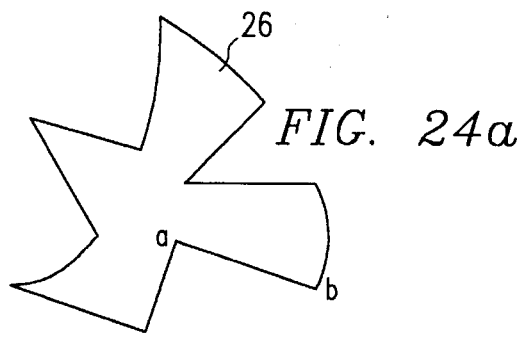
FIG. 24a
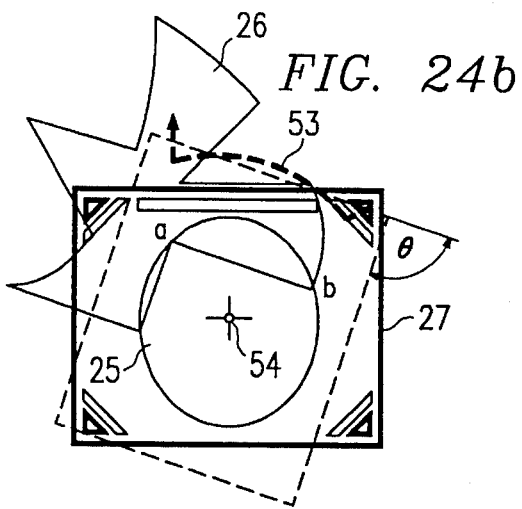
FIG. 24b
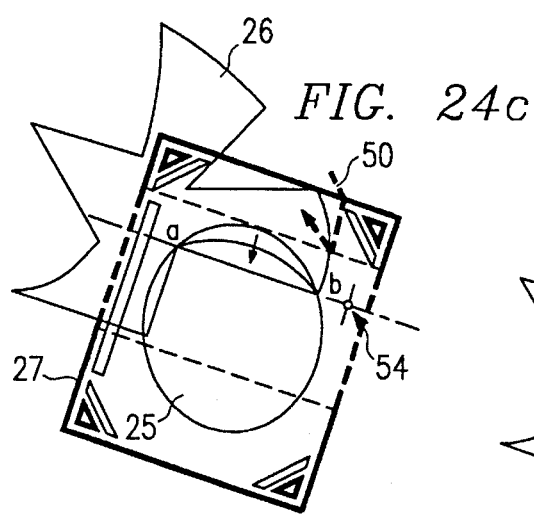
FIG. 24c
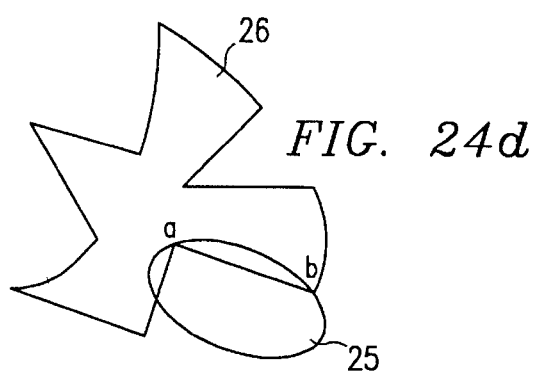
FIG. 24d
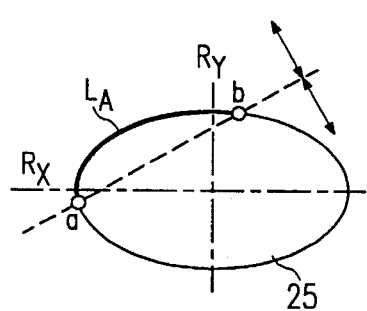
FIG. 25a
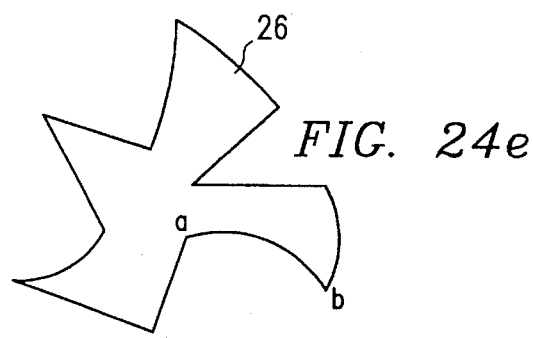
FIG. 24e
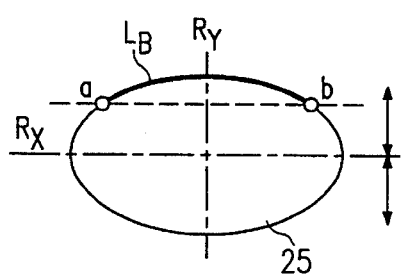
FIG. 25b
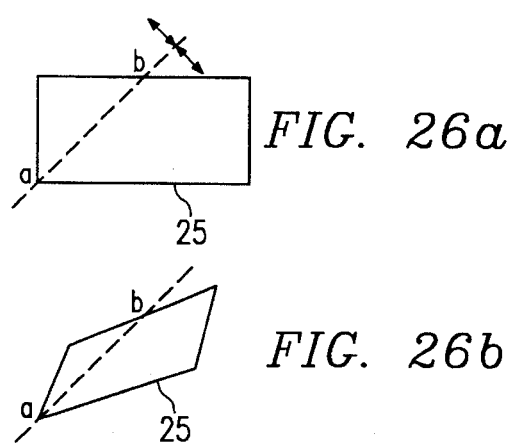
FIG. 26a
FIG. 26b

GRAPHIC MOVING/TRANSFORMING METHOD AND APPARATUS

FIELD OF THE INVENTION

The present invention relates to an apparatus for transforming and processing a graphic on the display unit of a computer by moving the graphic to any position, enlarging or contracting it into any size, or rotating it.

BACKGROUND OF THE INVENTION

In the process of drawing with a computer, it is frequently necessary to set a graphic on a display unit to a desired position or direction by finely adjusting its current position, angle, or size respectively.

One known conventional graphic processor utilizes a rectangular frame for control encloses a graphic subject to transformation. The graphic is displayed on the screen by specifying the subject graphic with a mouse and by dragging the mouse. The rectangular frame has control points at its four corners and the center.

When the operator selects a control point and drags the mouse, the subject graphic A rotates around the control point with the rectangular frame. However, it is frequently impossible to place the subject graphic at the correct position in respect to other graphics because the rotational center cannot be specified at a desired position. Therefore, it is necessary to repeat the operation for movement and rotation many times. Moreover, it is inconvenient to sequentially perform graphic processing such as movement, enlargement, contraction, and rotation because they are of separate modes. In addition, to enlarge the subject graphic, it is necessary to repeat the operation for enlargement and movement until the subject graphic is brought to a proper size and position because the central axis for enlargement is restricted to the center of the rectangular frame and the central axis cannot arbitrarily be designated.

Another known type of graphic processor allows the operator to specify the rotational centers of the subject graphic and the frame. For example, the official gazette of Published Unexamined Patent Application No. 2-292677 discloses a graphic processor in which a reference point serving as the center of the graphic processing function can be selected from specific positions. Also, the official gazette of PUPA No. 1-318168 discloses a document processor in which the origin serving as the center of the enlargement, contraction, or rotation function can be set at an arbitrary position. For these conventional graphic processors, however, it is only possible to change the size of the subject graphic in the X- and Y-axis directions of the graphic together with the frame about the origin (reference point). Therefore, it is impossible to transform the subject graphic in the X- and Y-axis directions of an arbitrary angle (in respect to the frame).

If the subject graphic can be transformed in the X- and Y-axis directions of any angle (in respect to the frame), it is believed that a curve with higher degree of freedom can be generated. For example, there is a case in which a curve with a proper curvature should be drawn in any section of a subject graphic A with a French curve. If it is possible to combine the subject graphic A with another graphic B corresponding to the French curve and change only the curvature of the graphic B without changing the position of the intersection between both graphics, a curve with a proper curvature can be drawn as if it is drawn with the French curve. The conventional graphic processor cannot perform the graphic processing with higher degree of freedom like the above.

SUMMARY OF THE INVENTION

It is an object of the present invention to provide a graphic processing method and an apparatus therefore allowing the operator to easily draw a curve with any curvature in any section of a graphic.

The present invention is characterized in that the relative relationship between a graphic subject to transformation on the screen of a computer and a frame which appears when the subject graphic is selected can be freely changed. The frame has operating members for size change, movement, and rotation. It is possible to provide a center-movement operating member in the frame for moving the transformation center.

The operating member for rotation rotates both the frame and subject graphic simultaneously, or only the frame or only the subject frame. It is possible to change the ratio for enlargement or reduction in accordance with the direction of the subject graphic by rotating only the frame or subject graphic, moving the transformation center, if required, and by changing the size. Therefore, it is possible to draw a curve with any curvature in any section of the graphic.

Because the present invention makes it possible to transform a graphic into one at any position and with any size and angle by selecting a position of the graphic, a curve can be freely generated and a graphic can be smoothly transformed.

BRIEF DESCRIPTION OF THE DRAWINGS

For a more complete understanding of the present invention and for further advantages thereof, reference is now made to the following Detailed Description taken in conjunction with the accompanying Drawings, in which:

FIG. 4 shows the flow for specifying the subject graphic in FIG. 3;

FIG. 5 shows an example of the frame generated when a subject graphic is specified;

FIG. 6 shows another example of the frame;

FIG. 7 shows an example of the data structure of the subject graphic;

FIG. 8 shows an example of the data structure of the frame;

FIG. 21 shows the processing flow for moving the transformation center;

FIG. 22 shows the processing flow for ending the operation;

FIG. 23 including 23(a)–23(d) shows an example the graphic processing according to the method of the present invention;

FIG. 24 including 24(a)–24(e) shows another example of the graphic processing according to the method of the present invention;

FIG. 25 including 25(a)–25(b) shows the comparison between the curve generated by the method in FIG. 24 and the curve generated by the conventional method;

FIG. 26 including 26(a)–26(b) shows still another example of the graphic processing according to the method of the present invention.

DETAILED DESCRIPTION OF THE INVENTION

Figure 1:
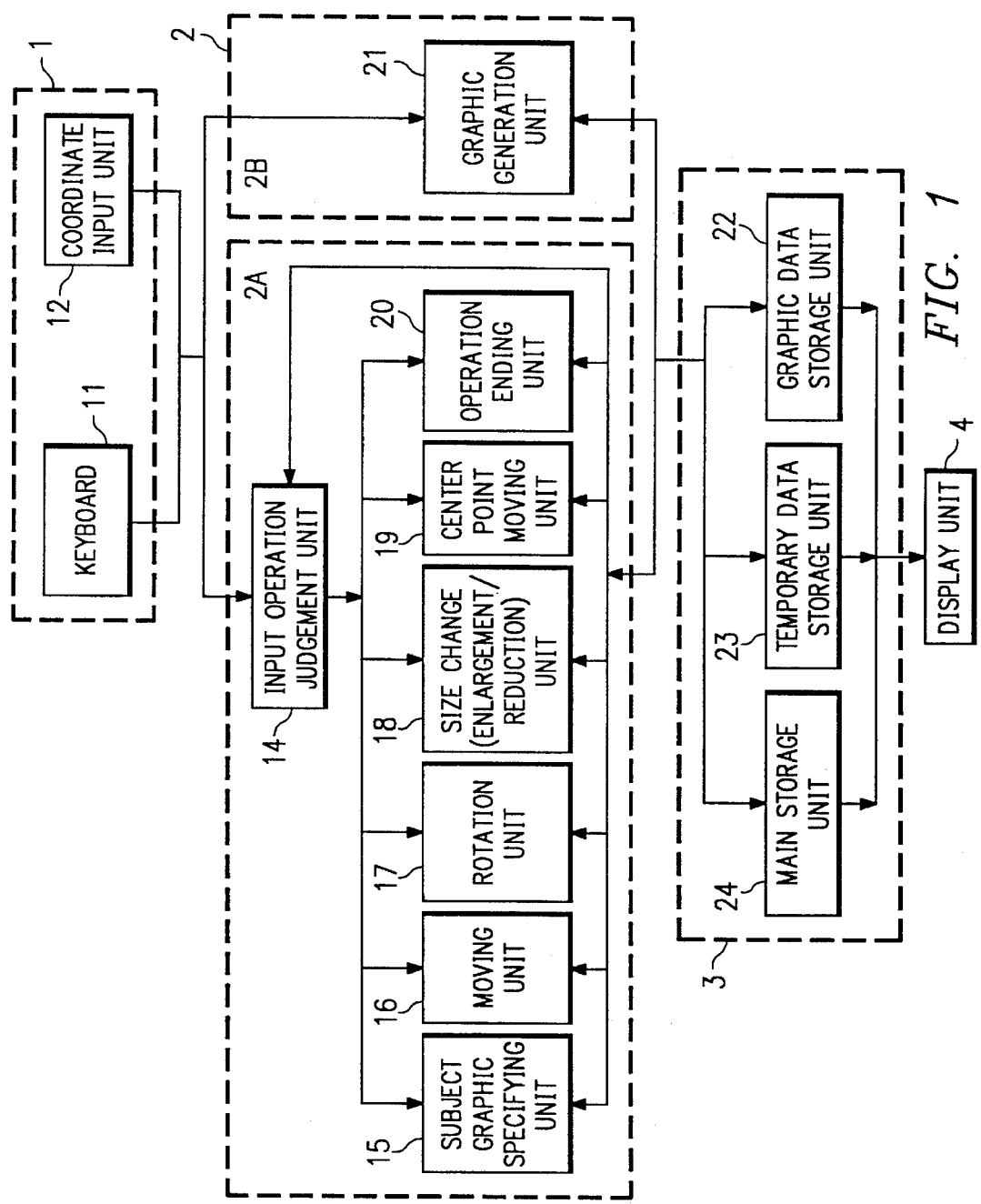
FIG. 1 shows the functional configuration of the graphic transforming apparatus which is an embodiment of the present invention.

FIG. 1 shows a functional configuration of the graphic transforming apparatus according to an embodiment of the present invention. In FIG. 1, reference numeral 1 generally indicates an input means for inputting information, commands, or data for the graphic to be transformed, reference numeral 2 generally indicates a graphic processing unit for transforming the graphic in accordance with the input, reference numeral 3 generally indicates a storage unit for storing commands for processing and graphic data, and reference numeral 4 generally indicates a display unit for displaying the process and result of graphic processing. The input means 1 includes a keyboard 11 and a coordinate input unit 12 such as a mouse. The graphic processing unit 2 consists of a graphic transformation unit 2A and a graphic generation unit 2B. The graphic transformation unit 2A includes an input operation judgment unit 14 for judging what type of operation is inputted, a subject graphic specifying unit 15 for specifying a subject graphic as a graphic to be transformed and generating a frame for enclosing the subject graphic, a moving unit 16 for moving the subject graphic and the frame, a rotation unit 17 for rotating the subject graphic and the frame, a size change unit 18 for changing, that is, enlarging or reducing the sizes of the subject graphic and the frame, a center point moving unit 19 for moving the center points of the subject graphic and the frame, and an operation ending unit 20 for performing the operation related to end of transformation. The graphic generation unit 2B includes a conventional graphic generation unit 21 for generating a graphic based on an input. The storage unit 3 has a graphic data storage unit 22 for storing the graphic to be processed and the data for the result of processing, a data temporary storage unit 23 for temporarily storing the data for the process of graphic processing, and a main storage unit 24 for storing the commands and procedure for graphic generation.

The graphic transforming apparatus in FIG. 1 may be formed with a microprocessor dedicated to execution of each function. However, it may be also attained with a general-purpose computer. For example, the graphic processing procedure, and commands and data necessary for graphic processing are stored in the storage such as ROM and RAM. That is, the procedure for executing the functions (details are described later) of the input operation judgment unit 14, the subject graphic specifying unit 15, the moving unit 16, the rotation unit 17, the size change unit 18, the center point moving unit 19, and the operation ending unit 20 is held in a storage in the form of programs together with related data. Then, the graphic processing is executed by a CPU in accordance with the above procedure and data. The graphic data inputted through the input unit such as coordinate values of the subject graphic, and the computation process and final results of the graphic processing are held in a RAM or buffer in the storage, while the results of graphic processing are displayed on the display unit 4.

Figure 2:
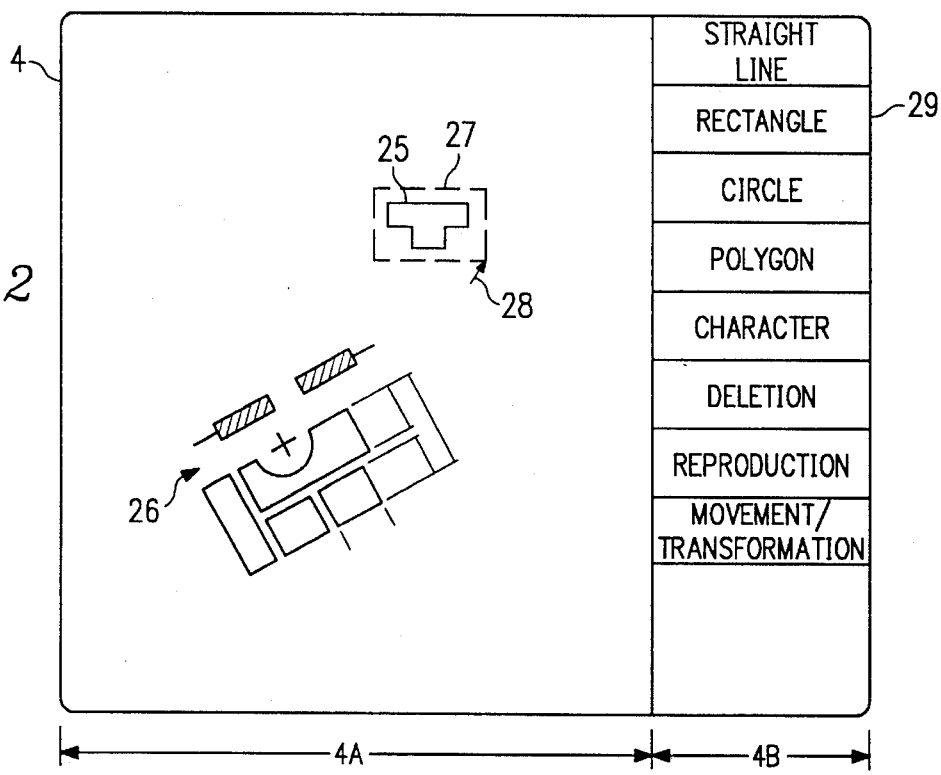
FIG. 2 shows an example of the display screen of the display unit in FIG. 1.

FIG. 2 shows an example of the display screen of the display unit 4. The display screen has a work area 4A and a command menu area 4B. A subject graphic to be processed 25, a background graphic 26, a moving/transforming frame 27, and a cursor 28 moving together with a mouse are displayed in the work area 4A. The background graphic 26 and the subject graphic 25 are simultaneously displayed on the screen by using the data in the graphic data storage unit 22 for the former and the data in the data temporary storage unit 23 for the latter. Displayed on the command menu area 4B are a command menu 29 including a conventional command menu used for the processing by the graphic generation unit, which a conventional graphic program has, and the menu for "movement and transformation," which is the feature of this invention.

Figure 3:
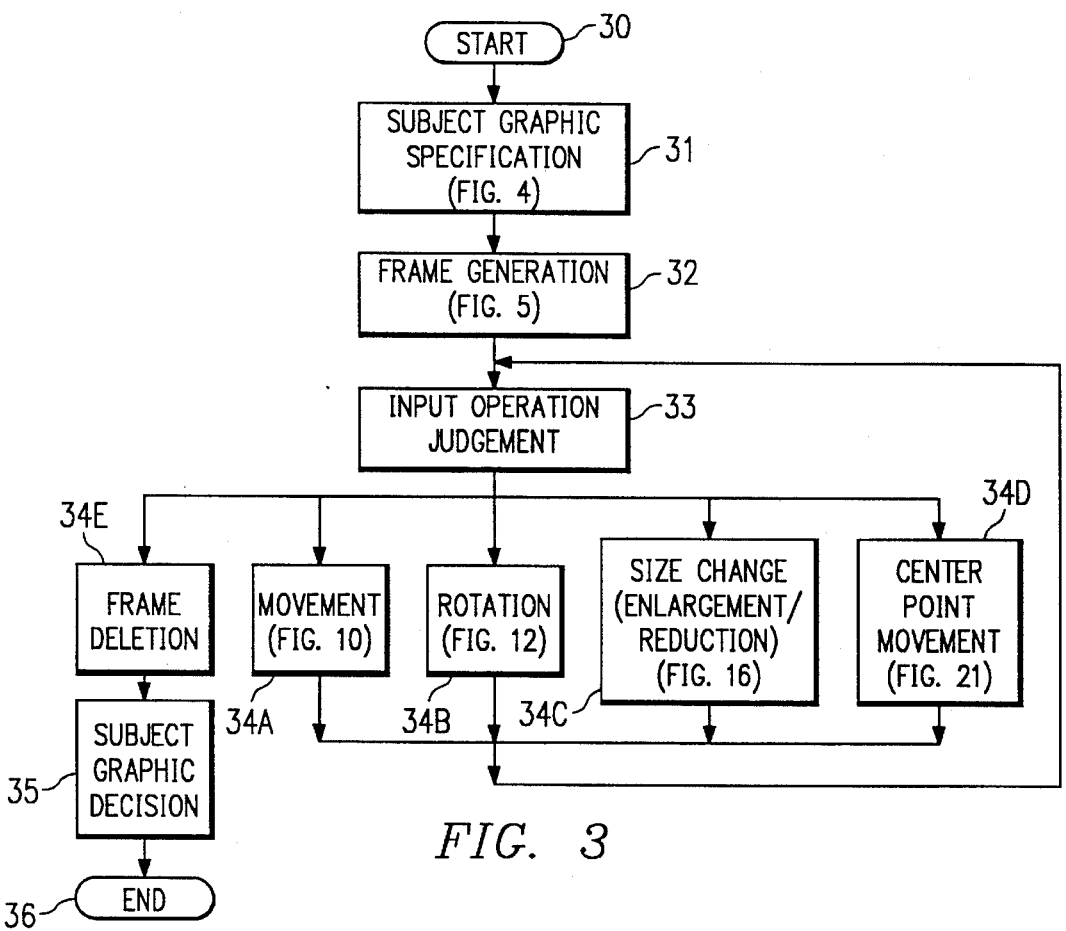
FIG. 3 shows a flowchart explaining the outline of the graphic transformation according to the present invention.

FIG. 3 is a flow chart showing the outline of the graphic transformation in accordance with the present invention. First, the graphic 25 is specified as a subject graphic by dragging a mouse on the graphic 25 and a frame 27 is generated (steps 31 and 32). Then, it is judged what type of input operation is selected (step 33). When the input operation is performed by the handle attached to the frame 27, the process proceeds to movement (step 34A), rotation (step 34B), size change (step 34C), or center point movement (step 34D) depending on the type of the operation. When the mouse is clicked outside the frame, frame deletion (step 34E) is executed. When a series of processings completes, the processing for decision of subject graphic (step 35) is executed and graphic processing ends (step 36).

FIG. 4 shows a flow for specifying a subject graphic. The operator operates the mouse to generate a frame enclosing the subject area 25 on the screen by dragging a rectangular area containing the subject graphic (step 41). Then, the data of the enclosed graphic is transferred from the graphic data storage unit 22 to the temporary storage unit 23 (step 42). Then, the data for the frame 27 is generated in the temporary storage unit 23 (step 43). The frame 27, as shown in FIG. 5, has a handler 50 for size change, a handle 51 for movement of frame and graphic, handles 52 for rotation of frame and graphic, handles 53 for rotation of frame, and a handle 54 for movement of center. Clicking on any one of the handles with the mouse results in the input operation and the corresponding processing is performed. It is possible to combine, for example, the frame rotating handle 53 or the frame and graphic rotating handle 52 with a graphic rotating handle 55 as shown in FIG. 6 instead of combining the frame and graphic rotating handle 52 with the frame rotating handle 53.

FIG. 7 shows an example of the data structure of the subject graphic 25. The subject graphic 25 and the background graphic 26 consist of a set of points (P1, P2, ..., Pi, ...) and the "X and Y coordinates" 61 of each point Pi and the "data indicating that each point Pi connects with which point" 62 are recorded in the storage unit 3.

For the data structure of the frame 27, as shown in FIG. 8, the data for the "X and Y coordinates", width, height, inclination, and center-point position of the frame is recorded in the storage unit. Also, the data for each handle (position and size) is calculated and recorded. However, the data for the center moving handle 54 is the same as the data for the position of the above center point.

Figure 9:
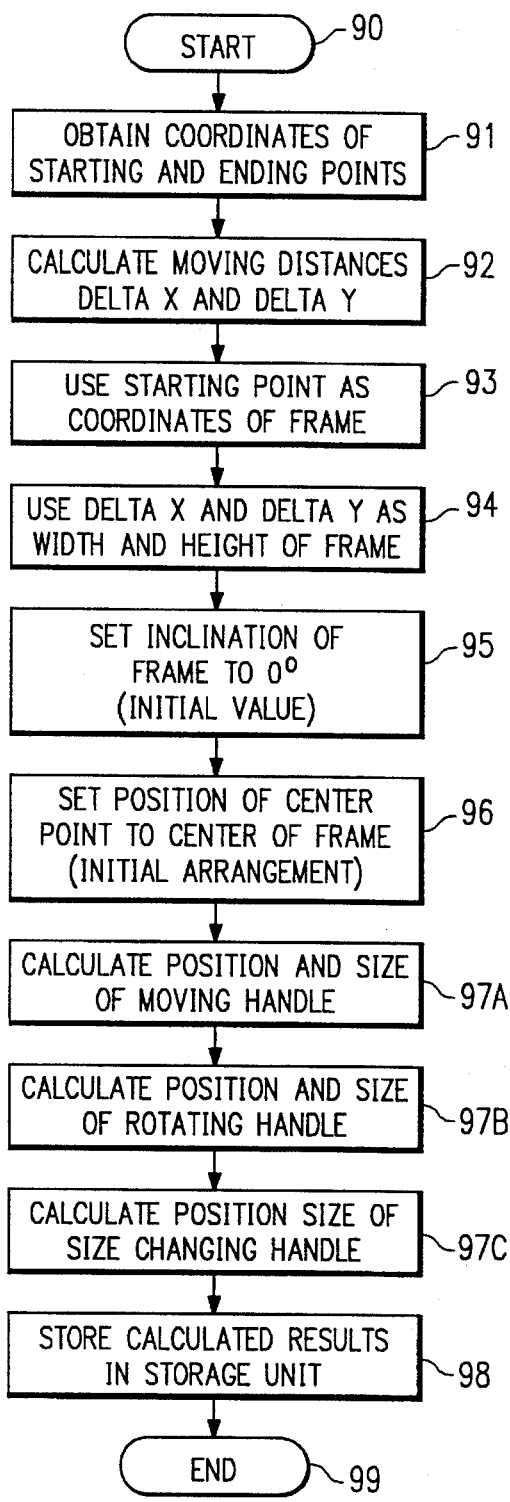
FIG. 9 shows the flow for generating the frame.

The frame 27 is generated as shown in FIG. 9. First, the coordinates of the starting and the ending points for dragging with a mouse on the display screen (X and Y coordinates) are obtained (step 91). Then, the moving distances delta X and delta Y are calculated from the difference between these coordinate values (step 92) to use the starting point as the X and Y coordinate values of the frame (step 93). The moving distances delta X and delta Y are used as the width and the height of the frame (step 94) and the inclination θ of the frame is set to the initial value 0 (step 95). The position of the center point is set to the center of the frame (initial value) (step 96). Then, the position and the size of the moving handle, those of the rotating handle, and those of the size changing handle are calculated (steps 97A through 97C). However, these calculations can be omitted. Finally, these results are stored in the storage unit 3 (step 98).

In the step for judgment of input operation, it is judged what type of input operation is selected, and the processing for movement, rotation, center point movement, size change, or operation ending is started in accordance with the judgment result.

Figure 10:
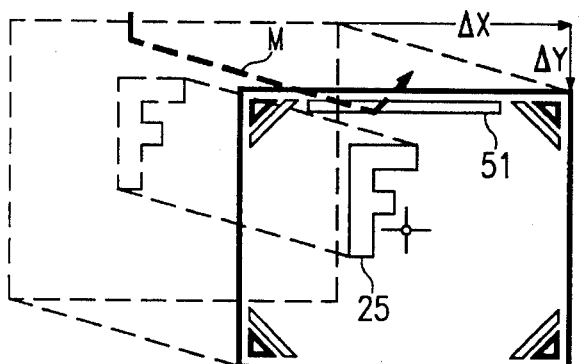
FIG. 10 shows the operation for movement.
Figure 11:
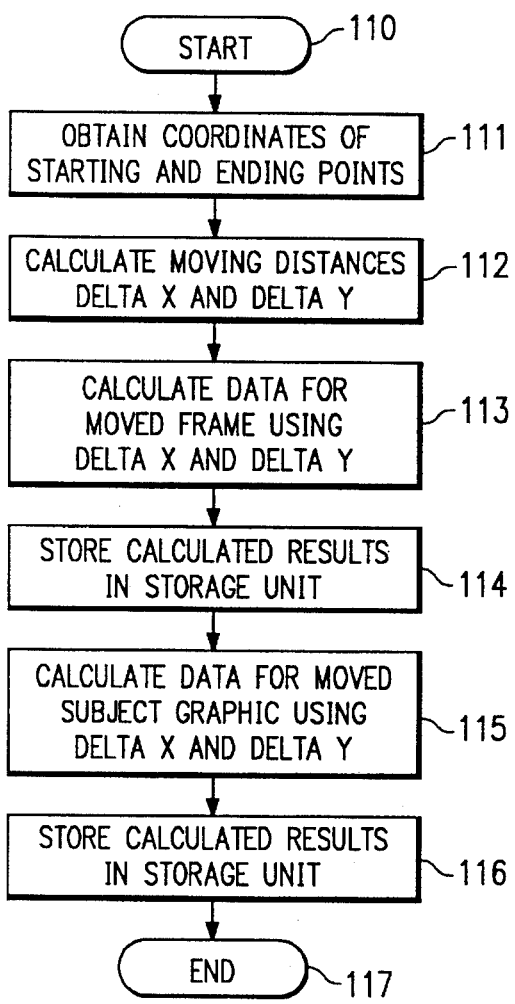
FIG. 11 shows the processing flow for movements.

As shown in FIG. 10, movement is performed by clicking the moving handle 51 of the frame 27 and dragging it in the direction M for movement. The frame 27 and the selected graphic 25 in the frame are moved together in parallel. If any other graphic is present at the moving destination, they are overlapped and displayed. However, the graphic at the destination is regarded only as a background and treated as one separate from the selected graphic 25. In the moving unit 16 (step 91), the coordinates of the starting and the ending points for dragging with a mouse are first obtained (step 111) as shown in FIG. 11. Then, the moving distances delta X and delta Y are calculated from the difference between the coordinate values (step 112), and the data for the moved frame and the data for the subject graphic are calculated and stored in the storage unit (steps 113 through 116).

Figure 12:
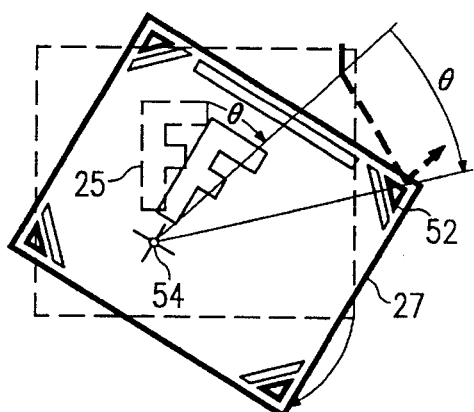
FIG. 12 shows the operation for rotating the frame and the graphic.
Figure 13:
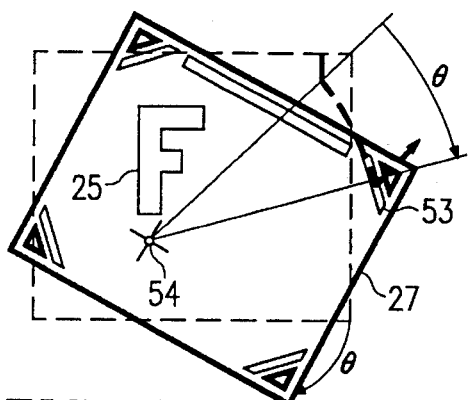
FIG. 13 shows the operation for rotating only the frame.
Figure 14:
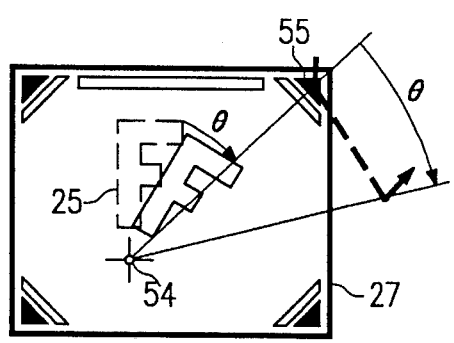
FIG. 14 shows the operation for rotating only the graphic.

Rotation includes simultaneous rotation of the frame and graphic, rotation of only the frame, and rotation of only the graphic. As shown in FIG. 12, when the frame and graphic rotating handle 52 is dragged, the graphic and frame simultaneously rotate by the angle θ about the center moving handle 54. As shown in FIG. 13, when the frame rotating handle 53 is dragged, only the frame 27 rotates about the center moving handle 54 but the subject graphic 25 does not rotate. This rotation is performed to change the direction of the frame for enlargement or reduction in one direction above mentioned. To perform rotation of only the graphic, it is only necessary to rotate the frame and graphic, and then to rotate only the frame by the same angle in the opposite direction. For the frame shown in FIG. 6, it is only necessary to drag the graphic rotating handle 55 as shown in FIG. 14.

Figure 15:
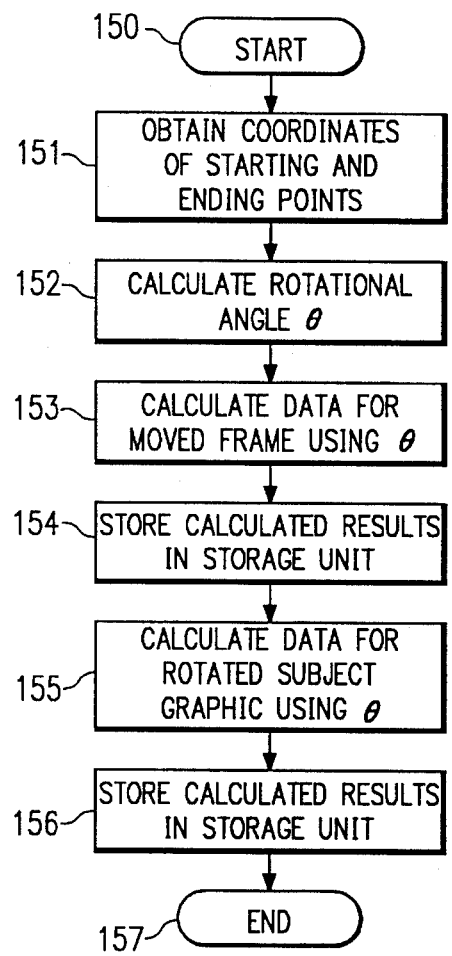
FIG. 15 shows the processing flow for rotation.

For the processing for rotation, as shown in FIG. 15, the rotational angle θ of the frame and the subject graphic are obtained from the difference between the coordinate values of the starting and the ending points for dragging (step 152), and the data for the rotated frame and the data for the subject graphic are calculated and stored in the storage unit (steps 153 through 156). However, only the data for the rotated frame is calculated for the case of FIG. 13, and only the data for the rotated subject graphic is calculated for the case of FIG. 14, and both data values are stored in the storage unit.

Figure 16:
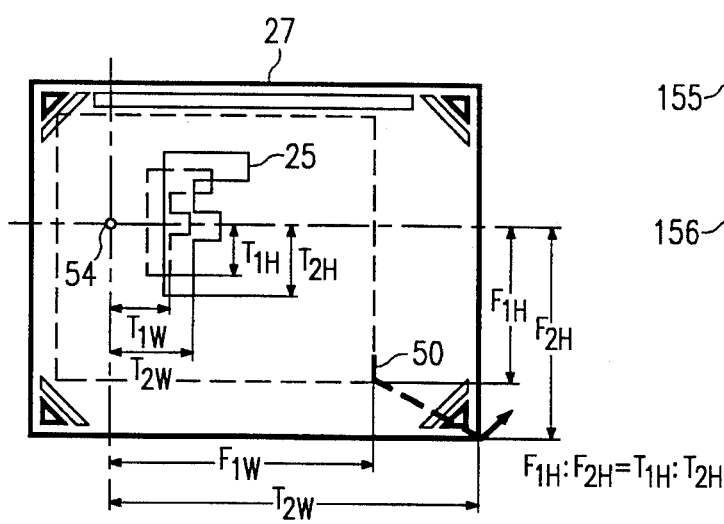
FIG. 16 shows the operation for size change.

Size change, that is, enlargement or reduction is performed by dragging the handle 50 for size change. The direction and the position can be freely selected. As shown in FIG. 16, when the corner of the frame is diagonally dragged, the subject graphic is enlarged or reduced together with the frame in the diagonal direction about the center moving handle 54. For the example in FIG. 16, the size of the frame is enlarged from F1W and F1H to F2W and F2H and the size of the subject graphic is enlarged from T1W and T1H to T2W and T2H.

Figure 17:
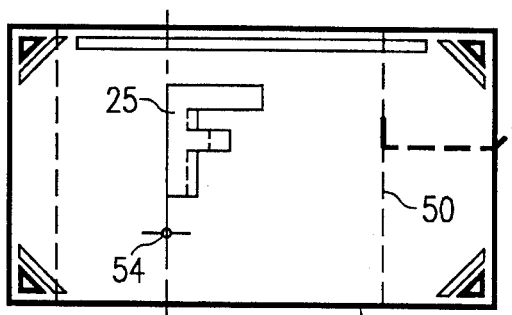
FIG. 17 shows the operation for size change only in one direction (X or Y direction)

As shown in FIG. 17, when the handle 50 for size change is dragged in one direction, that is, in a lateral direction, the subject graphic is enlarged or reduced only in one direction (X or Y direction) about the straight line (center line) passing through the handle 54 for movement of the center and parallel with the handle. As shown in FIG. 17, when the handle is dragged in the lateral direction, the subject graphic is enlarged only in the X direction (together with the frame). The enlargement or reduction rate is proportional to the distance between the center line and the dragged handle. By combining the above operation with frame rotation, the size can be changed in any direction.

Figure 18:
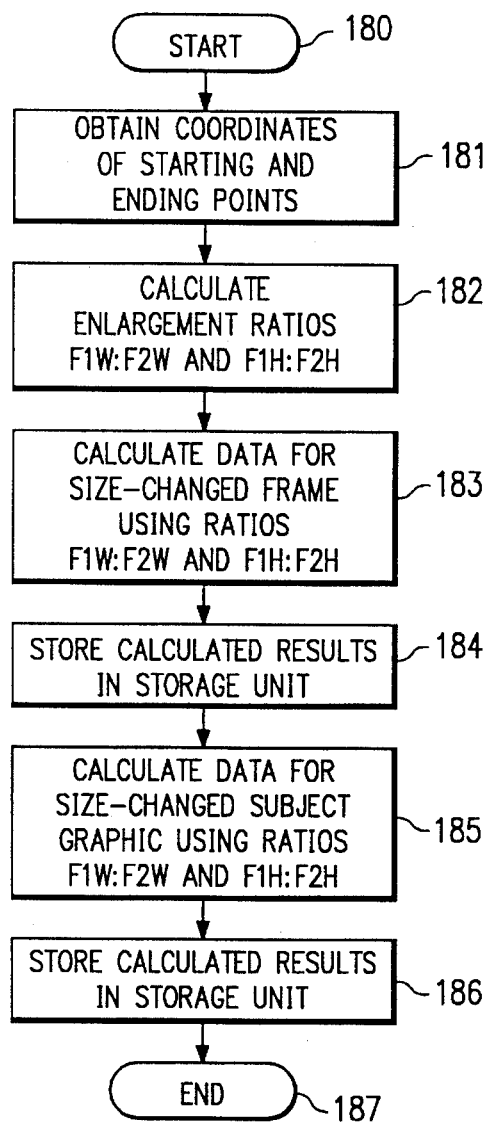
FIG. 18 shows the processing flow for size change.

For the processing for size change (enlargement or reduction), as shown in FIG. 18, the frame size change ratios F1W:F2W and F1H:F2H are obtained (step 182), the data for the size-changed frame and the data for the subject graphic are calculated in accordance with the relationship between the enlargement ratios F1W:F2W=T1W:T2W and F1H:F2H=T1H:T2H and stored in the storage unit 3 (steps 183 through 186).

Figure 19:
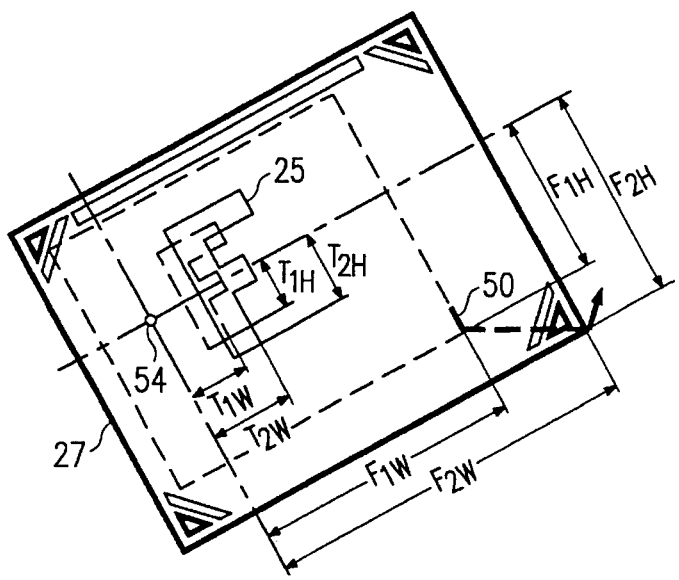
FIG. 19 shows the operation for size change when the frame is inclined.

The size change can be performed in any direction even if the frame is inclined. For the example, in FIG. 19, the sizes of the frame and the subject graphic are changed in accordance with the relationship between the ratios F1W:F2W= T1W:T2W and F1H:F2H=T1H:T2H. When the frame is inclined, it is possible to enlarge or reduce it only in one direction.

Figure 20:
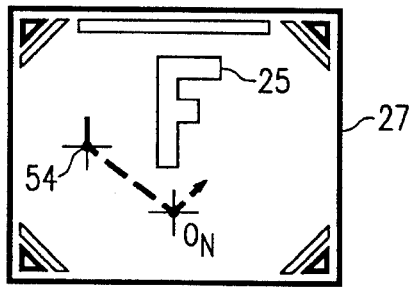
FIG. 20 shows the operation for moving the transformation center.

To move the transformation center, as shown in FIG. 20, a point not on the handle 54 for movement of the frame center is clicked. Then, the handle 54 for movement of the center at the transformation center moves to that point. In the center point moving unit 19, as shown in FIG. 21, the coordinates of the starting and the ending points for dragging with a mouse are first obtained (step 211). Then, the moving distances delta X and delta Y are calculated from the difference between the coordinate values (step 212), and the data for the moved center point is calculated and stored in the storage unit (steps 213 and 214).

FIG. 22 shows the processing for ending of operation. When the mouse is clicked outside the frame, transformation and movement are regarded to be ended, the frame disappears from the screen, the data for the subject graphic is moved from the temporary data storage unit to the graphic data storage unit, and the data for the frame is deleted. The data for the selected subject graphic is put together with the data for background graphic.

An example of graphic processing embodying the present invention will be explained by referring to FIG. 23. This example shows the operation including movement and transformation to bring the T-shaped subject graphic 25 into the background graphic 26, that is, to set it between two rectangles (261 and 262). In other words, the subject graphic 25 is placed between the background graphics 261 and 262 by increasing the width of the subject graphic 25 so that the gap between the subject graphic 25 and the background graphics 261 and 262 disappears, but keeping the height of the subject graphic as it is. To increase the width, it is necessary to make the direction for increase and that of the gap of the background graphic parallel. Therefore, it is necessary to rotate the subject graphic 25 before increasing the width. To make sure of the angle for rotation, the graphic 25 should be very close to the graphics 261 and 262. Therefore, this operation is performed in accordance with the following procedure.

[A] Parallely move the graphic 25 onto the graphics 261 and 262 by clicking the moving handle 51. In this case, fit the corner 25E of the graphic 25 to the corner 26E of the graphic 262.

[B] Then, drag the center moving handle 54 to fit it to the corner 26E. And drag the handle 52 for rotation of the frame and graphic to rotate it up to a proper angle about the fitted corner 26E so that the cross direction of the graphic 25 is parallel with the cross (gap) direction of the graphics 261 and 262.

[C] Then, drag the size changing handle 50 to enlarge the graphic 25 about the corner 26E in only one direction or in the direction of the gap by the amount of gap.

[D] Finally, click the mouse outside the frame, then the moving/transforming operation ends, the frame disappears, and the transformed subject graphic 25 is put together with the background graphics 261 and 262.

The present invention is characterized in that various transformation processings can be performed because relative rotation between a graphic and frame is possible. FIG. 24 shows an example of drawing using the relative rotation. First, the background graphic 26 is prepared (A). Then, an ellipse is prepared as the subject graphic 25 and moved so that it overlaps with the points a and b of the graphic 26. Then, only the frame is rotated by the angle θ counterclockwise so that one side of the frame is parallel with the line a-b (B). Then, the center point (center moving handle 54) is moved onto the line a-b to perform reduction only in the direction vertical to the line a-b (C). In this case, because the line a-b is on the center line, the points a and b do not move. That is, only the curvature of the curve changes (D). Then, the portion between the points a and b of the subject graphic 25 is replaced with the corresponding portion of the background graphic 26 by the graphic generation unit 21 to generate the new graphic 26(E). Thus, a line segment with any curvature can be generated at any position as if it is drawn with a French curve by rotating only the graphic or frame.

FIG. 25 shows comparison between the curve LA generated by the method in FIG. 24 (present invention) and the curve LB generated by the conventional method. As shown in FIG. 25(B), because the angular relation between the axes RX and RY of the subject graphic (ellipse) and the longitudinal and transverse directions of the frame is constant for the conventional method, the relationship between the points a and b to be selected on the subject graphic 25 and the transforming direction is restricted and thus, the curve to be generated is restricted. For the present invention, however, because the relative angle between the frame and the subject graphic can be freely changed, it is possible to select any angle and any positions a and b for the axes RX and RY of the ellipse when changing the size. Therefore, a line segment with a peculiar curvature like the curve LA can be easily generated. When the method in FIG. 24 is used for the subject graphic 25 which is a rectangle shown in FIG. 26(A), the rhombus shown in FIG. 26(B) can easily be generated.

Figure 27A:
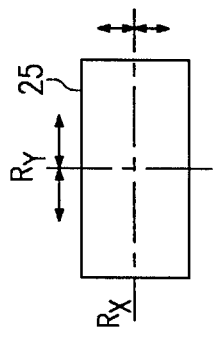
FIG. 27 including 27(a)–27(d) shows the conventional method for comparison with the method in FIG. 26.
Figure 27B:
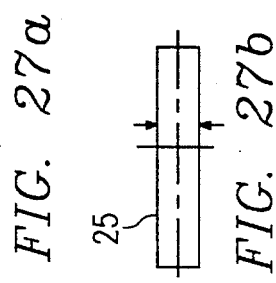
Figure 27C:
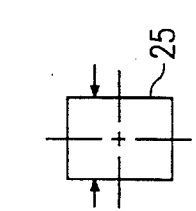
Figure 27D:
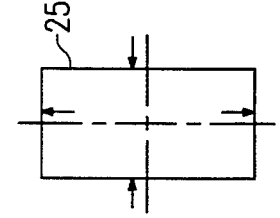

For the conventional method, however, transformation cannot be freely performed because the rectangle is kept even after transformation is executed as shown in FIGS. 27(B) through 27(D).

Although the present invention has been described with respect to specific embodiments thereof, various changes and modifications may be suggested to one skilled in the art. Hence, it is intended that the present invention encompass such changes and modifications as fall within the scope of the appended claims.

I claim:

1. A graphic moving/transforming apparatus, comprising:
   input means;
   display means; and
   graphic processing means, comprising:
      a frame for specifying an area containing a subject graphic to be processed; and
      means for generating and displaying on said display means operating members attached to said frame, wherein said subject graphic is moved or transformed by operating upon said operating members through said input means;
   said operating members comprising:
      a first operating member for moving a center of transformation about which said subject graphic is moved and transformed, said center of transformation optionally comprising a user designated point located within said frame; and
      a rotation operating member for changing a relative angle between said frame and said subject graphic about said center of transformation.

2. The graphic moving/transforming apparatus of claim 1, wherein said rotation operating member comprises:
   means for rotating said frame and said subject graphic together; and
   means for rotating only said frame.

3. The graphic moving/transforming apparatus of claim 1, wherein said rotation operating member comprises:
   means for rotating said frame and said subject graphic together; and
   means for rotating only said graphic.

4. The graphic moving/transforming apparatus of claim 1, wherein said rotation operating member comprises:
   means for rotating only said subject graphic; and
   means for rotating only said frame.

5. In a graphic moving/transforming apparatus comprising input means, graphic means, and display means, said graphic processing means having a frame for specifying an area containing a subject graphic to be processed and means for generating and displaying on said display means operating members attached to said frame, a graphic moving/transforming method of moving or transforming the subject graphic by operating said operating members through said input means, comprising the steps of:
   simultaneously rotating the frame and the subject graphic by direct manipulation of at least one of said operating members around a center of transformation, said center of transformation optionally comprising a user designated point located within said frame; and
   changing a relative angle between the frame and the subject graphic by direct manipulation of at least one of said operating members around said center of transformation.

6. In a graphic moving/transforming apparatus comprising input means, graphic processing means, and display means, said graphic processing means having a frame for specifying an area containing a subject graphic to be processed and means for generating and displaying on said display means operating members for movement, size change and movement of a center of transformation attached to said frame, said center of transformation optionally comprising a user designated point located within said frame, a graphic moving/transforming method of judging an input operation based on selection and operation of said operating members, and moving or transforming the subject graphic together with the frame, comprising the steps of:

moving the subject graphic together with the frame by selecting and operating a movement operating member;

rotating the frame and the subject graphic by selecting and operating a rotation operating member for the subject graphic and the frame;

changing a relative angle between the frame and the subject graphic by selecting and operating a rotation operating member for only the subject graphic or the frame;

changing a position of the center of transformation in the frame by selecting and operating an operating member for moving the center of transformation; and changing a ratio of enlargement or reduction of the subject graphic according to a direction of movement of the subject graphic by selecting and operating a size change operating member.

* * * * *